H. Lull. Shade Rack.
118253  PATENTED AUG 22 1871
Fig. 2  Fig. 1
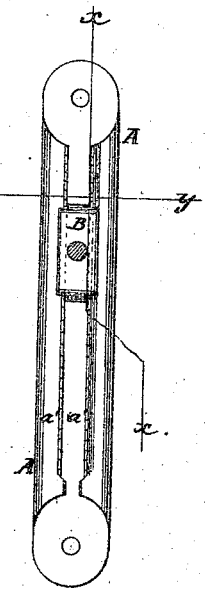
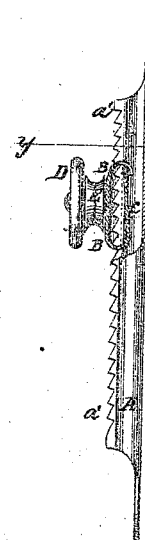
Fig. 3
Witnesses:
A. W. Almqvist
Wm. H. C. Smith
Inventor:
H. Lull
Per _____
Attorneys.
AM. PHOTO-LITHOGRAPHIC CO. N.Y. (OSBORNE'S PROCESS.)

UNITED STATES PATENT OFFICE.

HARVEY LULL, OF HOBOKEN, NEW JERSEY.

IMPROVEMENT IN SHADE-RACKS.

Specification forming part of Letters Patent No. 118,253, dated August 22, 1871.

*To all whom it may concern:*

Be it known that I, HARVEY LULL, of Hoboken, in the county of Hudson and State of New Jersey, have invented a new and useful Improvement in Shade-Rack; and I do hereby declare that the following is a full, clear, and exact description thereof, which will enable others skilled in the art to make and use the same, reference being had to the accompanying drawing forming part of this specification, in which—

Figure 1 is a front view of my improved shade-rack. Fig. 2 is a side view of the same, partly in section, through the line $x\,x$, Fig. 1. Fig. 3 is a detail cross-section of the same taken through the line $y\,y$, Figs. 1 and 2.

Similar letters of reference indicate corresponding parts.

My invention has for its object to furnish an improved rack for holding the pulley that receives, holds, and stretches the cord by which the shade is rolled and unrolled, and which shall, at the same time, be simple and inexpensive in construction and effective in operation; and it consists in the construction and combination of the various parts of the shade-rack, as hereinafter more fully described.

A is the body of the rack, which is made of sheet metal, cut into the proper shape and struck up into the desired form. The side edges of the plate are brought nearly together and are then bent outward, only sufficient space being left between them to receive the dog to which the knob-spindle is attached. The extreme edges of the plate A are turned outward and have teeth $a'$ formed in them, upon which the dog B takes hold. The upper end of the dog B is bent inward at the same angle as the inclination of the rack-teeth $a'$. The lower part C of the dog B is bent inward and upward, to serve as a spring to hold the dog B down upon the teeth of the body A. The upper end of the dog B is bent inward and downward, to receive and hold the end of the spring C, as shown in Fig. 2. The dog B is notched at its upper and lower ends, to receive the turned-out toothed edges of the body A, while the side edges of the dog B and spring C overlap the side edges of the body A. D is the knob, the spindle of which passes through the pulley E that receives the cord, and is secured to the dog B.

Having thus described my invention, I claim as new and desire to secure by Letters Patent—

The dog B and spring C, formed in one piece and in substantially the manner herein shown and described, to adapt them to fit and work upon the turned-out toothed edges of the body A, as and for the purpose set forth.

The above specification of my invention signed by me this 10th day of April, 1871.

HARVEY LULL.

Witnesses:
    JAMES T. GRAHAM,
    T. B. MOSHER.